United States Patent [19]
Newman

[11] Patent Number: 5,271,211
[45] Date of Patent: Dec. 21, 1993

[54] MODULAR, ANTI-CHAFING COVERING SYSTEM FOR HORSES

[76] Inventor: Marlene Newman, 1072 St. Matthews Rd., Chester Springs, Pa. 19425

[21] Appl. No.: 865,402

[22] Filed: Apr. 8, 1992

[51] Int. Cl.⁵ .............................................. B68C 5/00
[52] U.S. Cl. ...................................... 54/79.2; 54/79.4
[58] Field of Search ....................... 54/79.1, 79.2, 79.3, 54/79.4, 66

[56] References Cited

U.S. PATENT DOCUMENTS

| | | | |
|---|---|---|---|
| 195,371 | 9/1877 | Horisk | 54/79.1 |
| 2,443,831 | 6/1948 | Miller | 54/79.1 |
| 3,248,852 | 5/1966 | Schwartz | 54/79.1 |
| 4,214,421 | 7/1980 | Battle et al. | 54/79.2 |
| 4,671,049 | 6/1987 | Benckhuijsen | 54/79.4 |
| 4,955,182 | 9/1990 | Newman | 54/79.2 |

FOREIGN PATENT DOCUMENTS

| | | | |
|---|---|---|---|
| 245335 | 7/1963 | Australia | 54/79.1 |

Primary Examiner—Robert P. Swiatek
Attorney, Agent, or Firm—Caesar, Rivise, Bernstein, Cohen & Pokotilow, Ltd.

[57] ABSTRACT

A modular covering system for a horse comprising a base member arranged formed of an elastic material so that it can be worn in tight conformity with the torso of the horse. The material of the base member is of low friction so that when the base member is in place it protects the portion of the horse over which it is disposed from chafing. The base member also comprises releasable securement components to enable various conforming coverings to be releasably secured to the base member. One covering comprises a back cover for covering the back and sides of the horse. Another covering comprises a full body cover made up of a back cover and a forward cover, with the forward cover being coextensive with the base member. Each covering may include releasable connector elements to releasably secure a liner panel thereunder.

29 Claims, 6 Drawing Sheets

MODULAR, ANTI-CHAFING COVERING SYSTEM FOR HORSES

BACKGROUND OF THE INVENTION

The present invention generally relates to coverings for horses, and more particularly to a modular, anti-chafing covering system for horses.

In my U.S. Pat. No. 4,955,182, whose disclosure is incorporated by reference herein, there is disclosed an anti-rub device which is arranged to be worn on a horse under a blanket and overlying the torso, e.g., withers, chest, and shoulders, to protect those areas from chafing. The anti-rub device basically comprises a body portion formed of a stretchable, low friction, fabric which is arranged to be disposed about the torso of the horse, via the use of easy-on, easy-off VELCRO fastening elements, so that the body portion is in tight conformity with the underlying portions of the horse.

While the anti-rub device of my aforementioned patent is suitable for its intended purposes, its utility is limited to some extent by the fact that is used with conventional blankets, which are merely draped over it.

A need presently exists for an integrated covering system providing the advantages of the anti-rub device of my aforementioned patent while also providing covers having advantages over conventional blankets.

OBJECTS OF THE INVENTION

It is a general object of this invention to provide a modular covering system for horses which overcomes the limitations of the prior art.

It is a further object of this invention to provide a modular covering system for horses utilizing an anti-rub device as a means for releasably securing various types of modular covers on a horse.

It is a further object of this invention to provide a modular covering system for horses which is simple in construction.

It is a further object of this invention to provide a modular covering system for horses which is easy to use.

It is a further object of this invention to provide a modular covering system for horses which is readily adjustable to accommodate many variations in conformation of the horse.

It is a further object of this invention to provide a modular covering system for horses which is easy to adjust provide a conforming fit for the purpose of protecting the coat of the horse from chafing.

It is a further object of this invention to provide a modular covering system for horses which is easy to adjust about the horse for the purpose of providing a conforming fit for providing support for the underlying musculature.

It is yet a further object of this invention to provide a modular covering system for horses which includes various types of covers for various climatic conditions.

SUMMARY OF THE INVENTION

These and other objects of this invention are achieved by providing a modular covering system for a horse. The system basically comprises a base member and at least one cover member for releasable securement thereto.

The base member comprises a body portion, first releasable securement means for releasably securing the body portion to the horse, and second releasable securement means for releasably securing the cover member to the base member. The body portion of the base member comprises a stretchable fabric having low friction inner and outer surfaces. The body portion extends around the chest of the horse forwardly of its front legs, over its withers and sides in the region of its front shoulders and terminates at a rear edge located immediately to the rear of its front legs. The second releasable securement means is located on the body portion adjacent the rear edge.

The cover member comprises a panel comprising third releasably securable means arranged to be releasably secured to the second releasable securement means to secure the cover member to the base member. The cover member also comprises a rear portion arranged to extend over the back and sides of the horse from the rear edge back to a point adjacent the horse's tail.

In accordance with several preferred embodiments of this invention the cover members comprises a pair of elastic bands extending along portions of it and which are arranged for releasable securement to the base member adjacent the rear edge thereof to cause said cover member to closely conform to the body of the horse. Moreover, the rear portion of those cover members may also include an inner surface and fourth releasable securement means secured thereto. The fourth releasable securement means is arranged to releasably secure a liner panel under the rear portion of the cover member.

In accordance with other preferred embodiments of this invention the cover members include a forward portion which is substantially coextensive in size with the base member and which is integral with the rear portion of the cover members. The forward portion of the cover member is arranged to be disposed over the base member.

DESCRIPTION OF THE DRAWING

Other objects and many attendant features of this invention will become readily appreciated as the same becomes better understood by reference to the following detailed description when considered in connection with the accompanying drawing wherein.

DETAILED DESCRIPTION OF THE PREFERRED EMBODIMENT

Figures 1, 4:
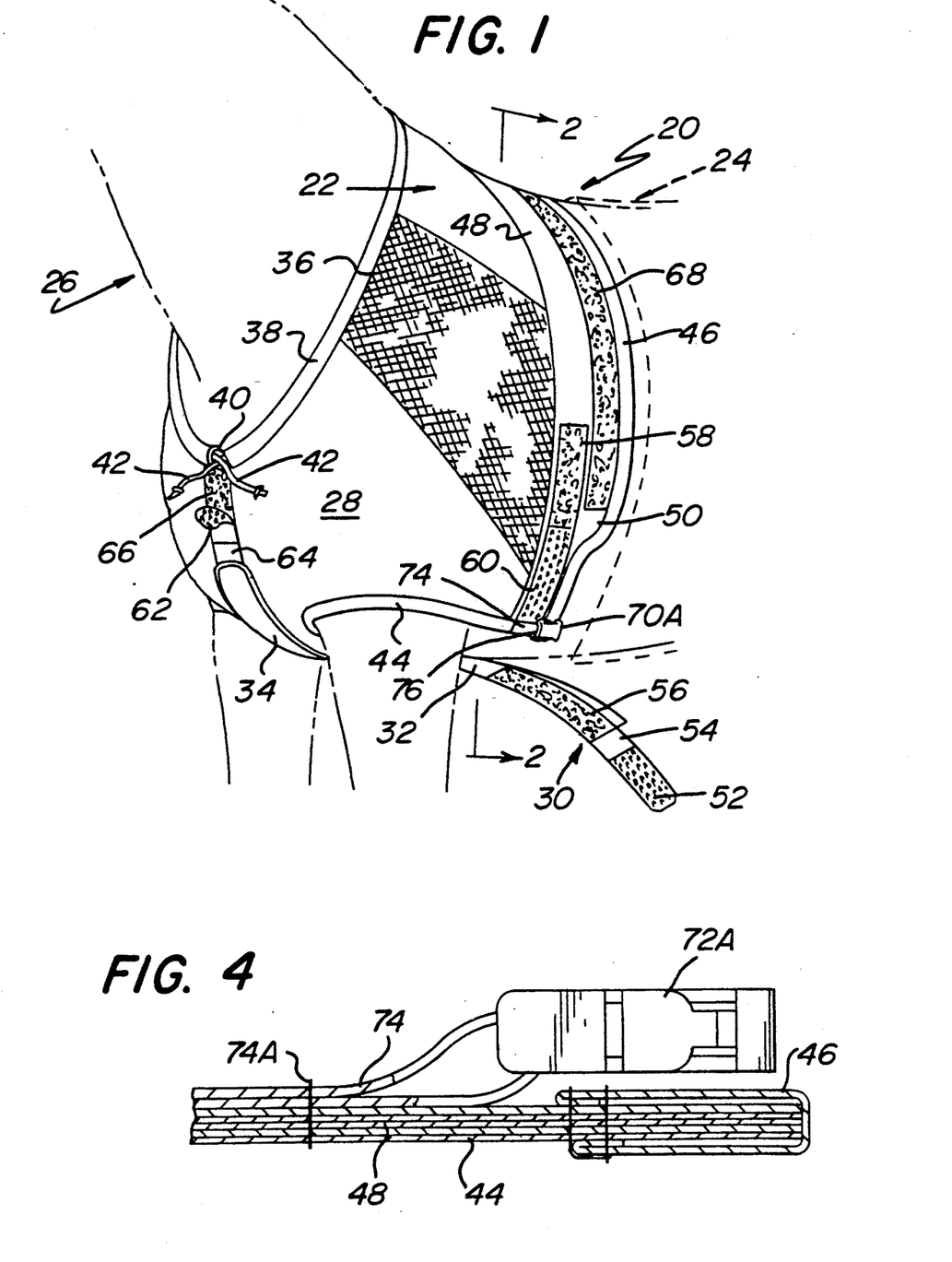
FIG. 1 is an isometric view of one embodiment of the modular covering system of this invention employing a base member and a rear cover shown in position on a horse.
FIG. 4 is an enlarged sectional view taken along line 4—4 of FIG. 2.

Referring now to various figures of the drawing wherein like reference numerals refer to like parts, there is shown at 20 in FIG. 1, one embodiment of a covering system constructed in accordance with the teachings of this invention. The covering system 20 basically comprises a base member 22 to which various types of covers constructed in accordance with this invention are arranged to be releasably secured. One such cover is shown by the phantom lines in FIG. 1 and designated by the reference number 24. The details of that cover as well as other embodiments of covers will be described later. The base member 22 will also be described in detail later. Suffice it for now to state that the base member is arranged to be worn on a horse 26 to protect the horse's torso, e.g., chest, withers, and portions of its sides, from chafing or rubbing by a blanket which may be placed over the horse. To that end, and in accordance with the preferred aspect of this invention, the base member 22 is constructed generally in accordance with the teachings of my aforementioned patent. However, unlike the anti-rub device of that patent, the base member 22 of the system 20 herein includes releasable securement means (to be described later) for releasably securing any one of various modular covers of this invention to the base member 22.

It must be pointed out at this juncture that while the base member 22 is particularly suited for use with covers constructed in accordance with this invention, it can nevertheless be used under conventional blankets, rain sheets, fly sheets, or other types of conventional covers.

Referring now to FIG. 1, the details of the base member 22 will now be described. As can be seen, that member basically comprises a main body portion 28 for covering the horse's torso to protect the underlying coat or hair, and securement means 30 for securing and maintaining the main body portion in proper position on the horse. The rear of the main body portion 28 encircles the barrel or girth of the horse just to the rear of the horse's shoulders. The securement means 30, like the anti-rub device of my aforementioned patent, basically comprises a surcingle tab 32 for extending about a portion of the barrel or girth of the body portion 28 for releasable securement thereto, and a second bib tab 34 extending transversely from the surcingle tab 32 and positionable between the front legs of the horse for releasable securement to the body portion 28 at the horse's chest.

The main body portion 28 may be formed in whole or in part of a blanket material which is preferably made of knit fabric stretchable in both the warp and weft directions. Both the inner and outer surfaces of the fabric have low friction characteristics, e.g., silky or satin finish to minimize chafing of the horse. Preferably the fabric is breathable to allow air to circulate through the fabric to maintain the skin of the horse in a healthy condition. Various types of fabrics can be utilized in the preferred embodiment, the knit fabric is made of Lycra fibers and referred to as Spandex. However, other stretchable low friction fabrics and materials can be used.

In the embodiment of the base member 22 shown in FIG. 1, the Spandex body portion 28 includes a pair of panels 36 (only one of which can be seen) formed of a different material, e.g., a tear resistant mesh material, such as "NFL Mesh." Each of the mesh panels 36 is preferably located over respective ones of the horse's shoulders. If desired, the entire body portion 22 may be formed of a mesh fabric, providing that it exhibits sufficient low friction to prevent chafing.

Figure 2:
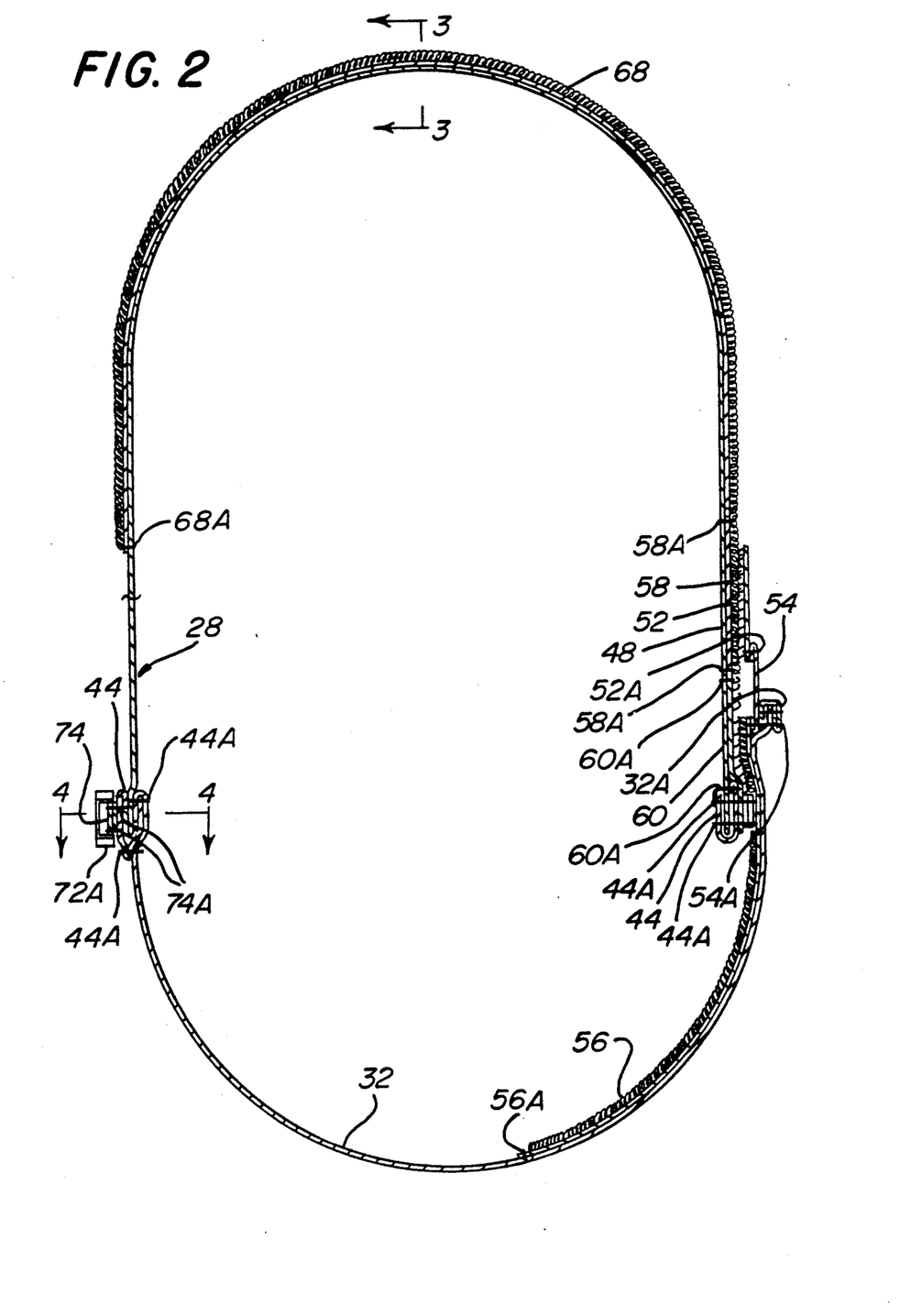
FIG. 2 is an enlarged sectional view taken along line 2—2 of FIG. 1.

The base portion 22 includes a continuous neck opening 38 for receiving the neck of the horse therethrough. The neck opening is formed by a stretchable band of elastic material, e.g., Spandex, which is secured, e.g., sewn, to the material making up the body portion 28. In particular, the band 38 is folded over itself and stitched to form a passageway 40 through which a drawstring 42 extends. The drawstring is arranged to be pulled to tighten the neck opening into close conformity with the neck region of the horse. The lower marginal edge 44 of the base member 22 comprises a band of the same elastic material as that forming the neck opening and is secured in place to the material forming the base portion 28 via marginal stitch lines 44A (FIG. 2). The rear marginal edge 46 of the base member is also formed of the same elastic material as that forming the neck opening and is secured to the material making up the girth portion 48 and the extension 50 thereof (to be described later) of the base member 22 via marginal stitch lines 46A.

Figure 3:
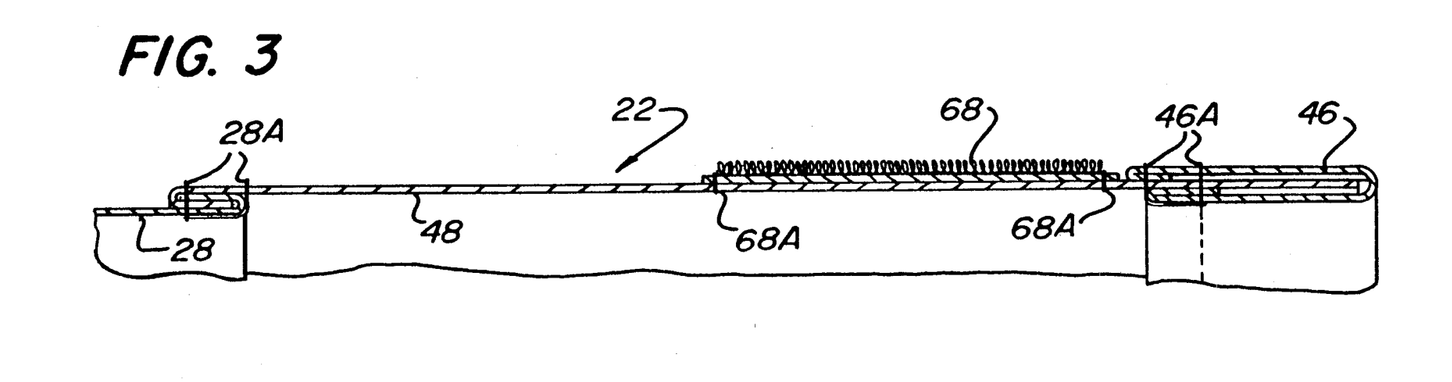
FIG. 3 is an enlarged sectional view taken along line 3—3 of FIG. 2.

The girth portion 48 at the rear of the body portion 28 is somewhat different than the comparable portion of the anti-rub device of my aforementioned patent in that it includes the heretofore identified rearward extension 50. The girth portion 48 comprises a strip of elastic material, e.g., Spandex or Laminate Spandex, which is secured to the rear edges of the fabrics making up the body portion 28 and shoulder panels 36 via stitch lines 28A (FIGS. 3 and 4).

As will be described in detail later, the extension 50 has secured thereon one component of a releasable securement means for releasably fastening any cover constructed in accordance with this invention to the base member 22. Before discussing that releasable securement means, a brief discussion of the means for securing the surcingle tab 32 and the bib tab 34 in place is in order.

Thus, attention is now directed to FIGS. 1 and 2. As can be seen therein, the free end of the surcingle tab 32 includes a vinyl strip 52 having VELCRO hooks on the inner surface thereof. The strip 52 is secured via a line of stitches 52A to a short web 54 of an elastic material, e.g., heavy gauge elastic. The web 54 is, in turn, secured to the free end of the surcingle tab 32 via a line of stitches 54A. The fabric making up the free end of the surcingle tab 32 is covered by piping 32A formed of the same material as the marginal edges 44 and 46. A strip 56 having VELCRO loops is secured via stitches 56A and 54A to the inner surface of the surcingle tab at the free end thereof.

In order to enable the strip 52 to be secured to the girth portion 48 of the base member 22, a strip 58 of VELCRO loops is secured on the outer surface of the girth portion 48 adjacent a shoulder panel 36 on one side of the base member 22. The strip 58 is secured in place via stitches 58A. A strip 60 of VELCRO hooks is located immediately below the strip 58 and is also secured in place by stitches 60A. The strips 52 and 56 on the surcingle tab 32 are arranged to be releasably secured to the strips 58 and 60, respectively, on the girth portion 48 to secure the surcingle tab in place and thereby completely encircle the barrel of the horse.

The bib tab 34 which extends transversely from the surcingle tab is constructed in a similar manner to the end of the surcingle tab. Thus, the bib tab 34 includes vinyl strip 62 of VELCRO hooks secured via an elastic web 64 to the free end of the bib tab 34. A strip (not shown) of VELCRO loops is secured to the inner surface of the free end of the bib 34. The strip 62 of the bib is arranged to be releasably secured to a strip 66 of VELCRO loops which is secured, i.e., sewn, on the front of the base member 22 immediately below the neck opening 36 at the center of the chest of the horse. A strip (not shown) of VELCRO hooks is secured immediately below the strip 66 for engagement by the strip of VELCRO hook components on the inner surface of the bib 34.

The vinyl strips 52 and 62 forming the free ends of the surcingle tab and the bib tab, respectively, may be folded over their associated elastic webs to engage their respective immediately adjacent VELCRO loop strips when the base member 22 is washed or otherwise cleaned to thereby prevent the VELCRO hooks from inadvertently attaching to undesired sections of the base member or other materials with which they may come in contact.

The means for releasably securing any cover constructed in accordance with this invention to the base member 22 will now be described. In accordance with the preferred embodiment of this invention such means basically comprises a strip 68 of VELCRO loops extending along the top surface of the girth extension 50 for virtually the entire length thereof, that is from a point on one side of the horse to a point on the other side of the horse. The strip 68 is secured in place by stitches 68A and is arranged to be releasably secured to a mating strip of VELCRO hooks (to be described later) forming a portion of each of the coverings constructed in accordance with this invention. A pair of respective snap connector elements 70A (FIG. 1) and 72A (FIG. 2) are located at the respective bottom corners of the girth portion 48 of the base member 22. These snap connectors are secured in place via a loop 74 (FIG. 4) of elastic material extending through a slot 76 (FIG. 1) in each of the connector elements. The loops are in turn sewn onto the base member by lines of stitches 74A (FIG. 4). The snap connector elements 70A and 72A are arranged to cooperate with associated snap connectors 70B and 72B (to be described later), respectively, forming portions of each of the covers constructed in accordance with this invention to act as further releasable securement means to hold such covers in place on the horse.

In accordance with the preferred embodiment of the invention, the snap connector elements 70A and 72A are in the form of female or box ends of a buckle, while the elements 70B and 72B comprise the male or prong ends of the buckle. The prong end connectors 70B and 72B are attached to portions of each of the various embodiments of the covers as will be described later.

As should be appreciated from the foregoing when the base member 22 is in place on the horse as shown in FIG. 1, it serves as an anti-rub device to prevent blanket chafing on the torso of the horse. However it also provides means for enabling a cover to be secured thereto to cover a portion or all of the horse from the base of its neck to its tail. To that end and as will be described later some covers of this invention are arranged to extend over the full length of the horse from the base of its neck to its tail. Each of such "full body covers" includes a forward portion, which is worn lightly over the base member 22, and a rear portion which is worn over the remainder of the horse up to its tail. Other covers, referred to as "half or rear covers", constructed in accordance with this invention are arranged to only cover the portion of the horse from the base member 22 back to the tail, with the base member itself covering the torso of the horse.

In the case where the cover is a full body cover, the base member 22 prevents the cover from riding back on the horse and binding up against the shoulders, that is, it keeps the cover in place forward of the girth. This feature is desirable since it serves to remove the pressure of the cover away from the withers and shoulders.

Figure 5:
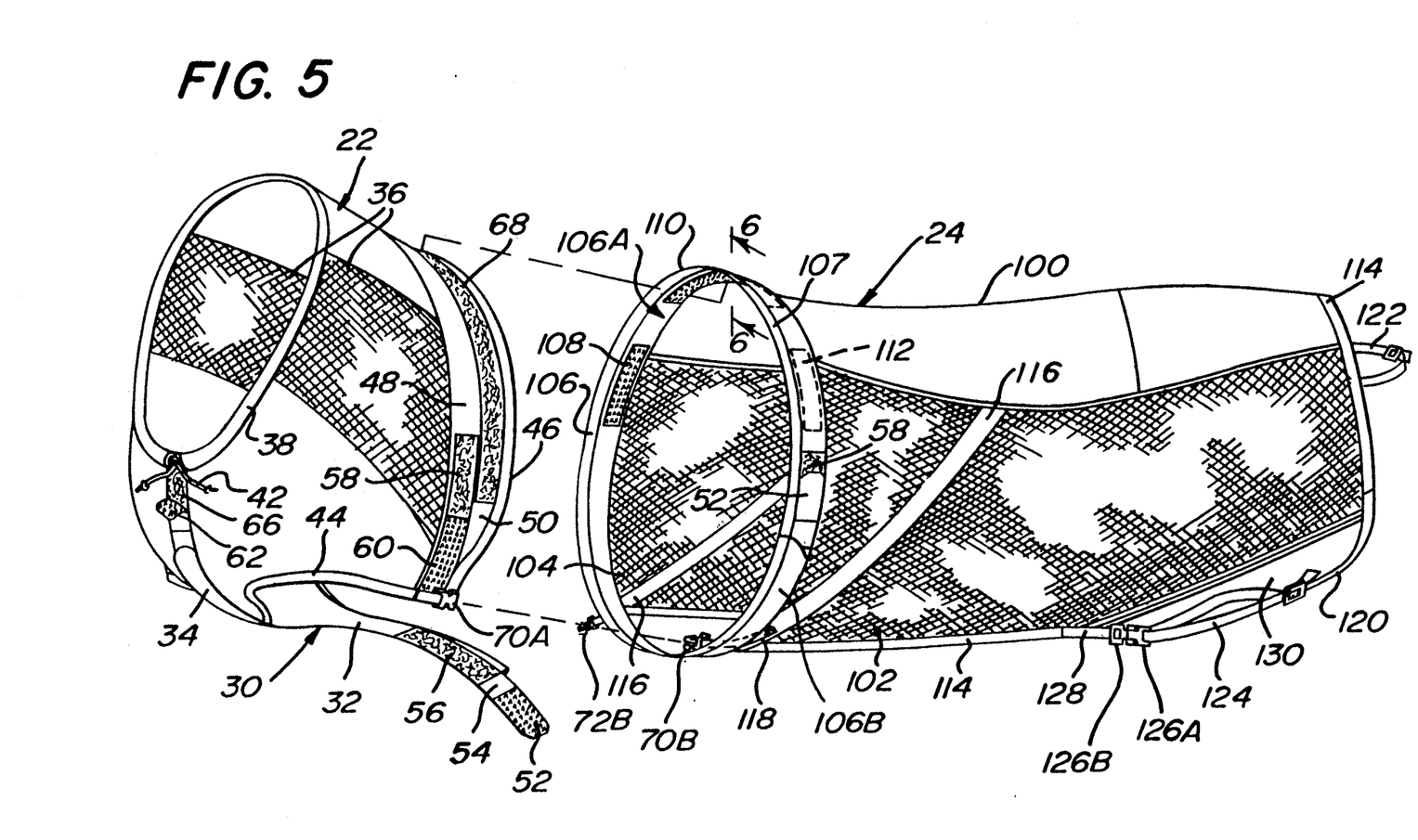
FIG. 5 is an exploded isometric view of the modular covering system shown in FIG. 1.

Referring now to FIG. 5, the details of the "half" cover 24 will be described. The cover 24 is merely exemplary of various half covers which may be constructed in accordance with the teachings of this invention. The cover 24 is constructed of materials such that it has particular utility in hot or warm environments, and can be used as a paddock sheet or lightweight cooler, and as protection from flies and/or sunburn. Moreover, the cover 24 can be used in cold environments, as well. In such a case it may be used under a conventional blanket to protect the horse from blanket chafing over the length of its body from its neck to its tail. To those ends the cover 24 basically comprises a top panel 100 formed of a four-way-stretch Lycra material which is arranged to be disposed over the entire back of the horse from the point of attachment of the girth extension 50 of the base member 22 back to the top of the tailbone; extending over the back and entire saddle area from the left side of the hip bone to the right side of the hip bone. The fabric making up the panel 100 preferably possesses a high wicking quality to promote evaporation of perspiration away from the body of the horse. In addition, the outer surface of panel 100 is highly reflective, e.g., metallic silver, to promote heat or sun reflectance.

Figure 6:
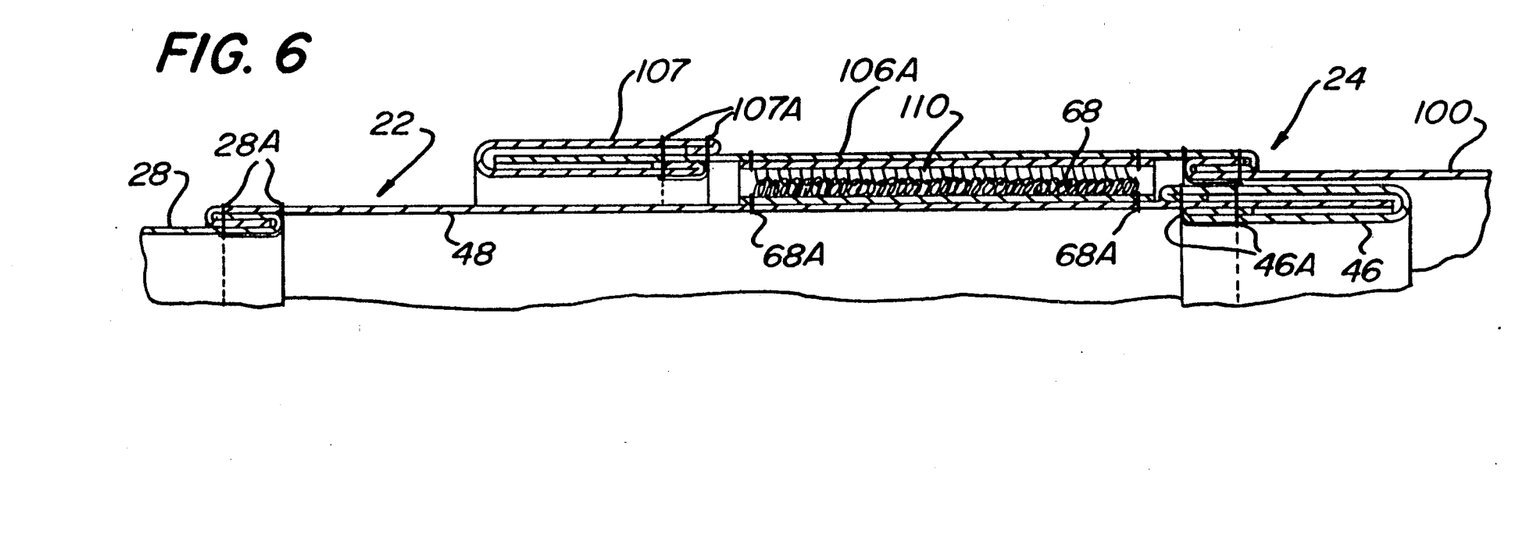
FIG. 6 is an enlarged sectional view taken along line 6—6 of FIG. 5.

Attached to both the left and right sides of the panel 100 are respective panels 102 and 104, each of which is formed of a highly breathable mesh fabric of open weave construction. The mesh fabric is the same as that used in the panels 36 of the base portion 22. The cover 24 includes a girth strap 106, formed of a four-way-stretch fabric. The girth strap 106, basically comprises a girth portion 106A extending along the front edges of the panels 102 and 104, and a free end portion 106B extending beyond the bottom of the side panel 104. The free end portion 106B of the girth strap will be described later. Suffice it for now to state that it is arranged to be releasably secured to a point of the girth portion 106A adjacent the side panel 102 to thereby form a band or loop which encircles the barrel of the horse. The front marginal edge of the girth band 106 is in the form of piping 107 formed of the same material as the neck opening 38 and is secured thereto via stitch lines 107A (FIG. 6).

Three strips 108, 110 and 112 of VELCRO hooks are secured, e.g., sewn, on the inner surface of the girth portion 106A of the back cover 24. These strips are arranged to be releasably secured to respective portions of the VELCRO loop strip 68 on the girth extension 50 of the base member 22. Hence, the strips 108, 110 and 112 form another portion of the means for releasably securing the cover 24 to the base member 22.

All of the seams of the cover 24 are reinforced for strength. Moreover, the covered piping (not shown) is utilized in the seams between the Lycra panel 100 and the mesh panels 102 and 104. The marginal edges 114 of the panels 100, 102 and 104 are formed of one-inch nylon strap webbing trimmed with additional binding of four-way-stretch fabric to finish the outer edge. This maintains a softness against the horse wherever it may lie against the horse's hair.

The covering 24 also includes two diagonal bands 116 of elastic material, e.g., breathable elastic webbing, which are secured across the mesh panels 102 and 104. These bands are self-adjusting and serve to provide tension to effect stretching of the Lycra panel 100 over the back and saddle area of the horse in a close fitting, contour-clinging manner when the cover 24 is in place on the horse and the girth strap 106 is engaged around the barrel of the horse. The bands 116 are each composed of a two-inch wide elastic material sewn to the associated mesh panel. Each band 116 extends from the piped seam at the interface of the Lycra panel 100 and the mesh panels 102 or 104 along a diagonal line extending from the top of the hip bone of the horse to the elbow and terminating at the lower corner of the girth strap 106. At the lower end of each diagonal elastic band 116 is a short, adjustable, elastic strap 118.

The heretofore identified male prong end snap connectors 70B and 72B are secured to respective ones of the staps 118. The connectors 70B and 72B are arranged to move freely in a semicircular direction so they can be readily manipulated by the user to engage their respective mating snap connectors 70A and 72A, respectively of the base member 22 to secure the lower front edge of the cover to the lower rear edge of the base member and thus prevent the engaging VELCRO strips 68, 108, 110 and 112 from accidentally peeling open while the cover 24 in place on the base member. The ends of the elastic bands 116 at which the buckles are connected, serve as anchor points for the elastic bands 116.

As mentioned earlier, the free end portion 106B of the girth strap 106 is arranged to be releasably secured to an intermediate portion 106A of the girth strap. Accordingly, the free end portion 106B of the girth strap is constructed in the same manner as the surcingle tab 32. In particular, a VELCRO loop strip 58 and a VELCRO hook strip 60 (not shown in FIG. 5) is secured on the outer surface of the girth band portion 106A adjacent the side panel 102 to releasably secure the VELCRO hook strip 52 and VELCRO loop strip of the free end 102B of the girth strap.

In order to further secure the fit of the cover 24 on the horse, the cover includes a pair of adjustable leg straps 120. Each strap is sewn on the lower hem 114 of an associated side panel 102 and 104 at two points toward the rear thereof. The straps 120 are intended to be passed around the rear legs of the horse. In addition, an adjustable tail strap 122 is sewn on the rear hem 114 at two points and is fitted around the tail to further insure that the cover does not rotate around the horse when it is in motion. Each leg strap 120 is formed of an elastic material having an adjustable size loop 124 at one end thereof and on which is threaded a female or box-like snap connector 126A. This connector is arranged to mate with a male or prong snap connector 126B secured to a mounting strip 128 on the lower hem 114 of the cover. Accordingly, when the two connectors 126A and 126B are secured together an adjustable size opening 130 is provided through which the horse's leg may be extended. The tail strap 122 is constructed in a similar manner to the leg straps.

The marginal edge or hem 114 of the cover 22 is preferably formed of a non-elastic material, e.g., nylon webbing. This material, as well as the in-seam piping and elastic leg and tail straps, effectively provides a framework which serves to maintain the panels 102 and 104 in a stretched condition over the muscles of the back and flanks of the horse, to thereby secure the cover 24 in a close, contour fit. Moreover, the framework of bindings serves to surround the stretch fabric to provide necessary strength to the construction.

The close contour fit of the stretch fabric panel 100, having the same slick, silky surface as that of the body portion 28 of the base member 22, in combination with the secure framework design provides what can be considered a "second skin", i.e., a barrier between any outer blanket (not shown) which may be placed over the system 20 and the horse's coat hair. This barrier prevents abrasion and chafing of the horse's coat from the girth line to the tail and wherever an outer blanket may lie too heavily on and/or rub against the horse's coat hair. In addition the close, conforming fit of the cover 24 provides adjustable tension for light support of the horse's muscles. In this regard, since the base member 22, as well as the cover 24, are in close conformity over the body of the horse from its neck to its tail, the system 20 aids in supporting the muscles of the horse in all areas of its anatomy which are covered thereby. Such support is unique and may be beneficial, particularly for equine athletes, and especially after periods of intense exercise, since the recovery time for muscles may be considerably lessened by the light compression. Moreover, the system 20 when applied to the horse in a manner described above, can be used as an aid in proper "cool-down" of the horse after strenuous exercise. Thus, the subject modular covering system provides a means for keeping the stretch fabric of the cover in a stretched condition over the entire body of the horse, and to maintain that cover in close conformity to the contours of the horse's body, and in addition maintain a high degree of comfort for the animal.

Figure 7:
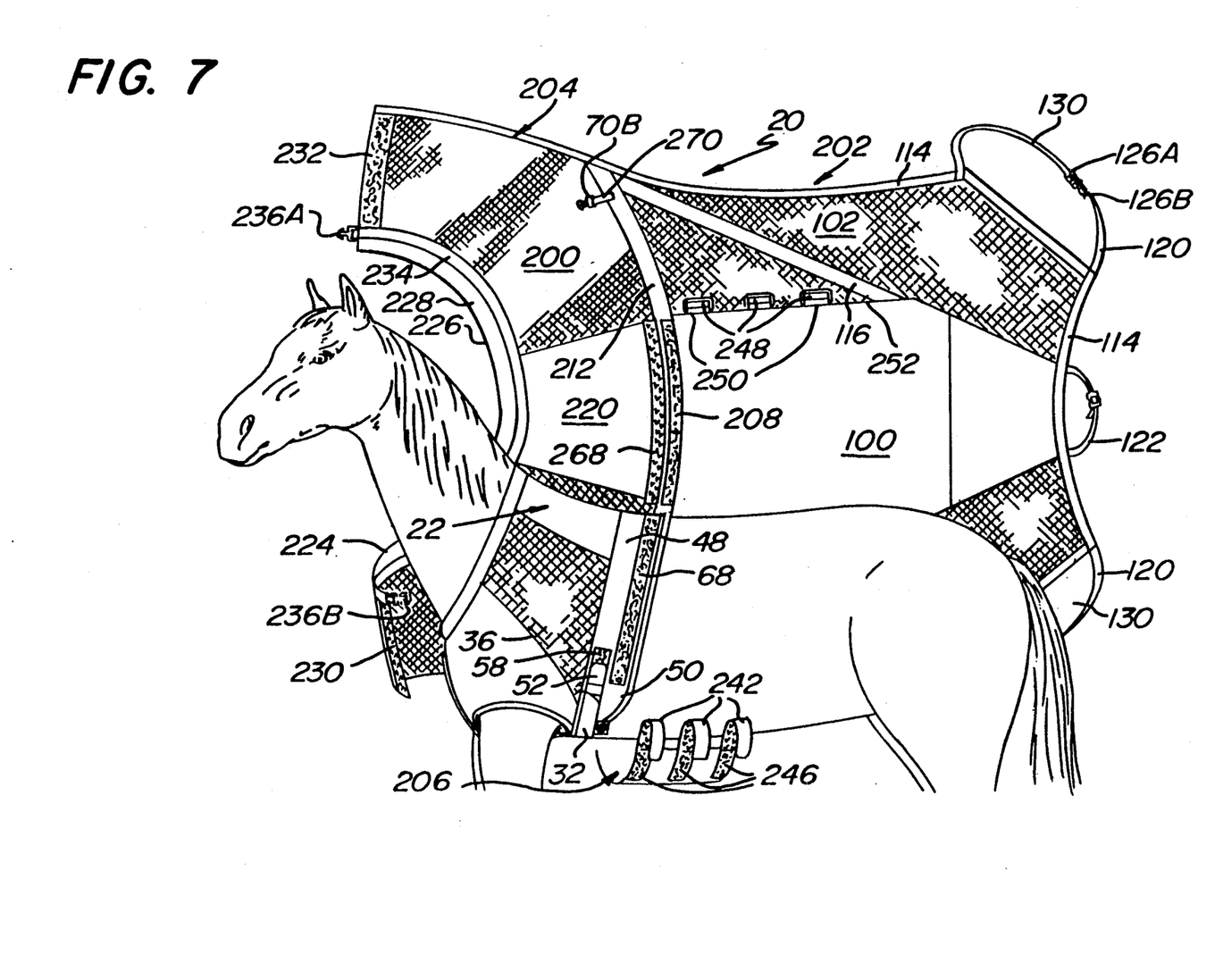
FIG. 7 is a side elevational view of another embodiment of the modular covering system of this invention employing the base member of FIG. 1 and a full body cover.
Figure 8:
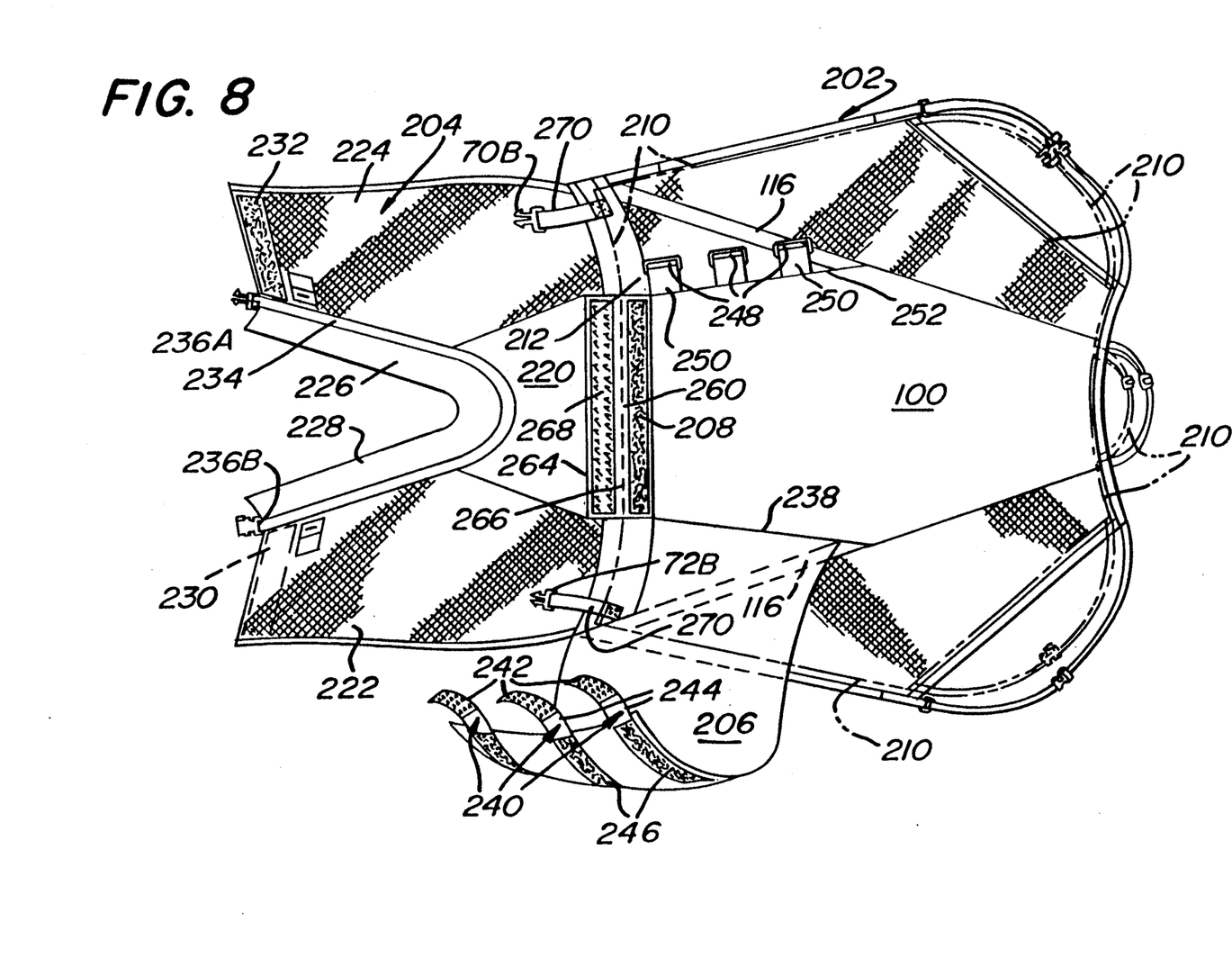
FIG. 8 is a plan view of the underside of the full body cover shown in FIG. 7.

In FIGS. 7 and 8 there is shown an alternative cover 200 constructed in accordance with another aspect of this invention. The cover 200 is a full body cover and includes a rear portion 202, which is similar in construction to the cover 24 described heretofore, and a front portion 204. The front portion 204 is arranged to be loosely worn over top of the base member 22. The rear portion 202 includes a adjustable under barrel panel 206 for covering the belly of the horse, and releasable securable means 208 for releasably securing an optional liner under the rear portion of the cover. The optional liner is shown by the phantom lines designated by the reference numeral 210 in FIG. 8. The interface between the front portion 204 and the rear portion 202 is in the form of a girth band 212 of an elastic material, e.g., Lycra, which is secured, via plural stitch lines (not shown) to the front and rear portions.

The details of the front portion 204 of the cover 200 will be described later. Suffice it for now to state that the forward portion is arranged to overlie and be coextensive with the base member 22.

As noted above, the rear portion 202 of the cover 200 is similar in many respects to the cover 24 described heretofore. Thus, in the interest of brevity, the structural details and function of the various common components of the cover 200 of FIGS. 7 and 8 and of the rear cover 24 of FIG. 5 will not be described again, although those common components will be given the same reference numbers.

Thus, as can be seen in FIGS. 7 and 8, the front portion 204 of the cover 200 basically comprises a central panel 220, formed of Lycra, and a pair of mesh side panels 222 and 224 formed of the same material as that forming the side panels 102 and 104 of the half cover 24 or material of similar characteristics, e.g., breathable, durable, etc. A generally V-shaped notch 226 is provided in the front portion 204 to accommodate the neck of the horse. The marginal edge of the notch 226 is in the form of a stretchable, elastic band 228 to elasticize the neckline and form a collar. A strip 230 (FIG. 8) of VELCRO hooks is secured, e.g., sewn, on the outer surface of the forward portion 204 of the cover 200 contiguous with its front edge. A strip 232 of VELCRO loops is secured on the inner surface of the forward portion 224 contiguous with the front edge thereof. The two strips 230 and 232 are arranged to be releasably secured together at the center of the chest of the horse so that the collar 228 encircles the horse's neck.

An elastic band 234 is secured, e.g., sewn, to the material forming the collar to further elasticize the collar. Each end of the band 234 includes a respective component of a snap-fitting connector secured thereto. Thus, one end of the band 234 includes a prong element 236A of a buckle secured thereto, while the other end of that band includes the mating box element 236B of that buckle. These two elements are arranged to be releasably secured together to further hold the front portion of the cover 24 in place about the shoulders and chest of the horse.

The barrel panel 206 is a generally rectangular shaped member which is secured, e.g., sewn, to the inner surface of the rear portion 202 of the cover along a line 238 (FIG. 8) which extends at a slight angle to the longitudinal axis of the cover. The free end of the panel 206, includes three tabs 240 secured thereto. Each tab is formed similar to the surcingle tab 32 described heretofore. Thus, each tab 240 includes a vinyl strip 242 having VELCRO hooks on the inner surface thereof. Each strip 242 is secured to a respective elastic web 244 via a line of stitches (not shown). Each web 244 is in turn secured to the outside of the panel 206 via stitches (not shown). A respective strip 246 having VELCRO loops thereon is secured via stitches (not shown) to the outer surface of the panel 206 contiguous with each of the webs 244.

Three D-rings 248 are secured, via respective straps 250, to the inner surface of the rear portion 202 of the cover 200 along a line 252 located opposite to the line 238. In fact, the line 252 is a mirror image of the line 238. Each of the D-rings 248 is arranged to receive therethrough the free end of an associated tab 240 so that the strip 242 of VELCRO hooks at the free end of that tab can be folded back onto the associated VELCRO loop strip 246 to hold the tab within the D-ring, thereby securing the barrel panel around the belly of the horse so that it closely conforms thereto. The free end of the tab can be folded over itself at various positions therealong while still enabling the VELCRO strips to engage each other. This enables adjustment of the barrel panel irrespective of the size or conformation of the horse. In accordance with one preferred embodiment of the invention, for an average size cover for a horse the panel extends back under the barrel for approximately 18".

The barrel panel may be fabricated of any suitable material, e.g., highly breathable stretch fabric of durable weave which promotes wicking of perspiration. By virtue of the fact that the barrel panel is fully adjustable, and preferably formed of a stretchable material, one can stretch the cover 200, as desired, around the barrel of the horse in a close conforming, contour fit over the muscles of the saddle area, back and flanks.

As can be seen clearly in FIG. 8 a web 260 of fabric, e.g., Lycra mesh, is fixedly secured, e.g., sewn, to the underside of the girth band 212 of the cover 200, so that the front edge portion 264 of the web can be folded back along a fold line 266 to form a flap. A strip 268 of VELCRO hook material is fixedly secured, e.g., sewn, to the inner surface of the flap 264. The VELCRO hook strip 268, is arranged to be releasably secured to the VELCRO loop strip 68 on the base portion 22 to hold the cover 200 in place on the horse. In order to connect the lower edges of the cover 200 onto the base member 22, the cover includes a pair of straps 270, secured, e.g., sewn, to opposite ends of the girth band 212. At the free end of one strap 270 is the prong connector 70B, while the prong connector 72B is at the free end of the other strap 270. The connectors 70B and 72B are arranged to be snap-fit into the box-like connector 70A and 72A, respectively, on the base member 22. Accordingly, when those members are secured together, the lower edges of the cover 200 are releasably secured to the lower edges of the base member 22. This action insures that the cover closely conforms to the musculature of the horse. The barrel panel, when secured in place as described above, also contributes to such action, while also providing a barrier to drafts from below.

As can also be seen in FIG. 8 the web 260 on the inside of the girth band 212 also includes a strip of VELCRO loops secured, e.g., sewn, thereon. This strip is located on the opposite side of the fold line 266 from the strip 268 and makes up the heretofore identified releasable securement means 208. This VELCRO loop strip 208 is arranged to be releasably secured to a mating VELCRO hook strip (not shown) on the upper surface of the liner 210 adjacent the front edge thereof to thereby releasably secure the liner under the rear portion of the cover 200. The liner also includes leg and tail straps like those described earlier with respect to cover 24.

The flap 264 with the VELCRO hook strip 268 thereon is arranged to be folded along the fold line 266 to cause the VELCRO hook strip 268 to be releasably secured to the VELCRO loop strip 208. Thus, when the cover is being washed or otherwise cleaned, the hooks of the VELCRO strip 26 will be prevented from snagging or attaching to some other portion of the cover or some other component.

It must be pointed out at this juncture that the cover 24 and 200 are merely exemplary of various covers that can be constructed in accordance with this invention. Thus, for example, a full body cover can be constructed of a water-repellant fabric to serve as a rain cover. The rain cover can be utilized alone or with an easily removable, highly absorbent liner fabricated of stretchable Lycra fleece having excellent wicking qualities. Such a liner is desirable whenever the horse is wet, or it is desired that extra compression or extra warmth be provided. For cold weather applications, the cover can include a body portion formed of a laminated construction made up of two fabrics, both of which are preferably stretchable in both warp and weft directions, and both of which are preferably breathable. Thus, for example, the inner fabric which engages the coat of the horse may be Spandex while the outer fabric is in the form of an open mesh knit fabric made of rayon, cotton, or other similar low-friction material. The manner in which the fabrics are secured together to permit a high degree of relative movement therebetween is described in my aforementioned U.S. Pat. No. 4,955,182. Alternatively, a cold weather cover can be constructed of a fabric of durable quality and water repellency on the outside in combination with fiber-filled or other comparable quality materials for warmth on the inside and which may be bonded to the outside fabric. Irrespective of the construction of the cover, a liner can also be used with a cold weather cover. In such a case, the liner may be made of stretch fleece or comparable fabric having Lycra content of 10% or higher fabric to be warm, breathable and stretchable over the contours of the horse.

As should be appreciated from the foregoing the modular covering system of this invention is simple in construction, easy to use and adjust, provides support for the horse's musculature while also protection against chafing of its coat. Moreover, one can readily select an appropriate covering from various types of modular covers to achieve a desired goal, e.g., protection from sunburn, rain, insects, heat, and cold.

Without further elaboration the foregoing will so fully illustrate my invention that others may, by applying current or future knowledge, adapt the same for use under various conditions of service.

I claim:

1. A modular covering system for a horse comprising a base member and a cover member for releasable securement thereto, said base member comprising a body portion, first releasable securement means for releasably securing said body portion to said horse, and second releasable securement means for releasably securing said cover member to said base member, said body portion of said base member comprising a stretchable fabric having a low friction outer surface, said body portion extending around the chest of the horse forwardly of its front legs, over its withers and sides in the region of its front shoulders and terminating at a rear edge located immediately to the rear of its front legs, said second releasable securement means being located on said body portion adjacent said rear edge, said cover member comprising a panel comprising third releasably securable means arranged to be releasably secured to said second releasable securement means to secure said cover member to said base member, said cover member comprising a rear portion arranged to extend over the back and sides of the horse from said rear edge back to a point adjacent the horse's tail, said second and third releasable securement means each comprising respective VELCRO components, said second releasable securement means additionally comprising a first pair of snap connector elements, said third releasable securement means comprising a second pair of snap connector elements, and wherein respective ones of said first snap connector elements are arranged to be releasably secured to respective ones of said second snap connector elements.

2. The system of claim 1 wherein said cover member additionally comprises a pair of elastic bands extending along portions of said cover and arranged for releasable securement to said base member adjacent said rear edge to cause said cover member to closely conform to the body of said horse, and wherein respective ones of said second snap connector elements are secured to said elastic bands.

3. The system of claim 2 wherein said cover member includes strap means for encircling each rear leg of said horse.

4. The system of claim 3 wherein said cover member includes strap means for encircling the tail of said horse.

5. A modular covering system for a horse comprising a base member and a cover member for releasable securement thereto, said base member comprising a body portion, first releasable securement means for releasably securing said body portion to said horse, and second releasable securement means for releasably securing said cover member to said base member, said body portion of said base member comprising a stretchable fabric having a low friction outer surface, said body portion extending around the chest of the horse forwardly of its front legs, over its withers and sides in the region of its front shoulders and terminating at a rear edge located immediately to the rear of its front legs, said second releasable securement means being located on said body portion adjacent said rear edge, said cover member comprising a panel comprising third releasably securable means arranged to be releasably secured to said second releasable securement means to secure said cover member to said base member, said cover member comprising a rear portion arranged to extend over the back and sides of the horse from said rear edge back to a point adjacent the horse's tail, said rear portion of said cover comprising a first portion formed of a stretchable material having low friction inner and outer surfaces located over the back of the horse and a pair of second portions, said second portions being located on respective sides of said horse, each of said second portions being formed of a mesh material.

6. A modular covering system for a horse comprising a base member and a cover member for releasable securement thereto, said base member comprising a body portion, first releasable securement means for releasably securing said body portion to said horse, and second releasable securement means for releasably securing said cover member to said base member, said body portion of said base member comprising a stretchable fabric having a low friction outer surface, said body portion extending around the chest of the horse forwardly of its front legs, over its withers and sides in the region of its front shoulders and terminating at a rear edge located immediately to the rear of its front legs, said second releasable securement means being located on said body portion adjacent said rear edge, said cover member comprising a panel comprising third releasably securable means arranged to be releasably secured to said second releasable securement means to secure said cover member to said base member, said cover member comprising a rear portion arranged to extend over the back and sides of the horse from said rear edge back to a point adjacent the horse's tail, said cover member additionally including a forward portion substantially coextensive in size with said base member, said forward portion being arranged to be disposed over said base member, said forward portion of said cover member including a pair of extensions and releasable securement fastening means, each of said extensions being arranged to extend over a respective side of the chest of said horse, with said fastening means fastening said extensions together at the mid-chest of said horse to hold said forward portion of said cover member in place over said base member.

7. The system of claim 6 wherein said fastening means comprises a pair of cooperating VELCRO components, one of said components being secured to one of said extensions, one of said components being secured to one of said extensions and the other of said components being secured to the other of said extensions.

8. The system of claim 7 wherein said fastening means additionally comprises a pair of snap connector elements, one of said elements being secured to one of said extensions and the other of said elements being secured to the other of said extensions.

9. The system of claim 6 wherein said cover member additionally comprises a pair of elastic bands extending along portions of said cover member and arranged for releasable securement to said base member adjacent said rear edge to cause said rear portion of said cover member to closely conform to the body of said horse.

10. The system of claim 9 additionally comprising a pair of snap connector elements, said elements being secured to respective ones of said bands, each of said snap connector elements being arranged to be releasably secured to a corresponding snap connector element on said base member adjacent said rear edge.

11. A modular covering system for a horse comprising a base member and a cover member for releasable securement thereto, said base member comprising a body portion, first releasable securement means for releasably securing said body portion to said horse, and second releasable securement means for releasably securing said cover member to said base member, said body portion of said base member comprising a stretchable fabric having a low friction outer surface, said body portion extending around the chest of the horse forwardly of its front legs, over its withers and sides in the region of its front shoulders and terminating at a rear edge located immediately to the rear of its front legs, said second releasable securement means being located on said body portion adjacent said rear edge, said cover member comprising a panel comprising third releasable securable means arranged to be releasably secured to said second releasable securement means to secure said cover member to said base member, said cover member comprising a rear portion arranged to extend over the back and sides of the horse from said rear edge back to a point adjacent the horse's tail, said first releasable securement means comprising a surcingle tab located closely adjacent said rear edge of said base member and arranged to extend about the girth of the horse, and wherein said second releasable securement means is located between said surcingle tab and said rear edge of said base member.

12. The system of claim 11 wherein said rear portion of said cover member includes an inner surface and fourth releasable securement means secured thereto, said fourth releasable securement means being arranged to releasably secure a liner panel under said rear portion of said cover member.

13. The system of claim 12 wherein said liner panel includes fifth releasable securement means thereon, said fifth releasable securement means being arranged to be releasably secured to said fourth releasably securable means.

14. The system of claim 13 wherein said fourth and fifth releasable securement means comprise respective VELCRO components.

15. The system of claim 13 wherein said liner panel includes strap means for encircling each rear leg of said horse.

16. The system of claim 15 wherein said liner panel includes strap means for encircling the tail of said horse.

17. The system of claim 11 wherein said second and third releasable securement means each comprise respective VELCRO components.

18. The system of claim 11 wherein said cover member additionally comprises a pair of elastic bands extending along portions of said cover member and arranged for releasable securement to said base member adjacent said rear edge to cause said cover member to closely conform to the body of said horse.

19. The system of claim 18 wherein said cover member includes strap means for encircling each rear leg of said horse.

20. The system of claim 19 wherein said cover member includes strap means for encircling the tail of said horse.

21. The system of claim 11 wherein said rear portion of said cover member comprises a first portion formed of a stretchable fabric having low friction inner and outer surfaces.

22. The system of claim 11 wherein said cover member additionally comprises a forward portion substantially coextensive in size with said base member, said forward portion being arranged to be disposed over said base member.

23. The system of claim 22 wherein said forward portion of said cover member and said rear portion of said cover member are formed as an integral unit.

24. The system of claim 22 wherein said rear portion of said cover member includes an inner surface and fourth releasable securement means secured thereto, said fourth releasable securement means being arranged to releasably secure a liner panel under said rear portion of said cover member.

25. The system of claim 24 wherein said fourth releasable securement means comprises a VELCRO component.

26. The system of claim 11 wherein said second releasable securement means comprises at least one strip of a VELCRO component.

27. The system of claim 11 wherein said rear portion of said cover member comprises a first portion formed of a material which is resistant to the passage of sunlight therethrough.

28. The system of claim 27 wherein said first portion is formed of a stretchable material.

29. The system of claim 28 wherein said material is light weight and breathable.

* * * * *